United States Patent
Fujimoto et al.

(10) Patent No.: US 8,857,285 B2
(45) Date of Patent: Oct. 14, 2014

(54) SADDLE TYPE VEHICLE AND VEHICLE POWER UNIT

(75) Inventors: Yasushi Fujimoto, Wako (JP); Kinya Mizuno, Wako (JP); Yoshiaki Tsukada, Wako (JP); Takashi Ozeki, Wako (JP); Kazuhiko Nakamura, Wako (JP); Mitsuo Nakagawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 364 days.

(21) Appl. No.: 13/398,307

(22) Filed: Feb. 16, 2012

(65) Prior Publication Data

US 2012/0247242 A1    Oct. 4, 2012

(30) Foreign Application Priority Data

Mar. 31, 2011  (JP) .................................. 2011-077074
Mar. 31, 2011  (JP) .................................. 2011-077249

(51) Int. Cl.
*F16H 3/08*      (2006.01)
*F16H 3/00*      (2006.01)
*B62K 25/28*     (2006.01)
*F16H 3/16*      (2006.01)

(52) U.S. Cl.
CPC .............. *F16H 3/006* (2013.01); *B62K 25/283* (2013.01); *F16H 3/16* (2013.01)
USPC .............. 74/331; 74/329; 74/337.5; 180/230; 180/227

(58) Field of Classification Search
CPC ....... F16H 63/18; F16H 3/006; F16H 61/688; F16H 2059/0234; F16H 59/02; F02B 61/02; F02B 61/06; B60W 10/113; B60W 2300/185; B60W 2300/36; B62K 11/04; B60Y 2200/12
USPC ........ 74/325, 329, 331, 333, 340, 335, 337.5; 180/227, 230
See application file for complete search history.

(56) References Cited

U.S. PATENT DOCUMENTS

| | | | |
|---|---|---|---|
| 7,823,684 B2* | 11/2010 | Shiozaki et al. | 180/292 |
| 8,104,562 B2* | 1/2012 | Maehara et al. | 180/219 |
| 8,567,276 B2* | 10/2013 | Saitoh | 74/340 |
| 2007/0227283 A1 | 10/2007 | Fujimoto et al. | |
| 2009/0107429 A1* | 4/2009 | Maehara et al. | 123/90.12 |
| 2009/0107750 A1* | 4/2009 | Maehara et al. | 180/219 |

(Continued)

FOREIGN PATENT DOCUMENTS

| | | |
|---|---|---|
| JP | 2007-271047 A | 10/2007 |
| JP | 2008-303939 A | 12/2008 |
| JP | 2009-156339 A | 7/2009 |
| JP | 2009-210020 A | 9/2009 |

*Primary Examiner* — Troy Chambers
*Assistant Examiner* — Valentin Craciun
(74) *Attorney, Agent, or Firm* — Birch, Stewart, Kolasch & Birch, LLP (57) ABSTRACT

A saddle type vehicle having mounted thereon a power unit is provided with a twin clutch type transmission including a pair of main shafts and a pair of clutches along different axes, to enable a compact layout of axes and a reduction in size of the unit and its surroundings. The axis center (first main axis) of a first main shaft is disposed rearwardly of the axis center (crank axis) of a crankshaft and forwardly of the axis center (counter axis) of a counter shaft, whereas the axis center (second main axis) of a second main shaft is disposed rearwardly of the axis center (counter axis) of the counter shaft and forwardly of the axis center (pivot axis) of a pivot shaft.

20 Claims, 6 Drawing Sheets

(56) References Cited

U.S. PATENT DOCUMENTS

| | | | |
|---|---|---|---|
| 2010/0107810 A1* | 5/2010 | Saitoh | 74/664 |
| 2010/0206253 A1* | 8/2010 | Fujimoto et al. | 123/90.15 |
| 2010/0242655 A1* | 9/2010 | Ieda et al. | 74/473.1 |
| 2012/0247254 A1* | 10/2012 | Mizuno et al. | 74/473.16 |
| 2013/0062135 A1* | 3/2013 | Saitoh et al. | 180/230 |
| 2013/0081895 A1* | 4/2013 | Nomura et al. | 180/220 |

\* cited by examiner

SADDLE TYPE VEHICLE AND VEHICLE POWER UNIT

CROSS-REFERENCE TO RELATED APPLICATION

The present application claims priority under 35 U.S.C. §119 to Japanese Patent Application Nos. 2011-077074 and 2011-077249, filed on Mar. 31, 2011, respectively, each of the above-identified applications is incorporated by reference.

BACKGROUND OF THE INVENTION

1. Field of the Invention

The present invention relates to a saddle type vehicle having mounted thereon a power unit which includes a twin clutch type transmission having main shafts and clutches along different axes.

2. Description of Background Art

Hitherto, there has been known a vehicle power unit provided with a twin clutch type transmission wherein gear trains for a plurality of gear speeds established selectively are provided between a pair of main shafts disposed in parallel to each other and a counter shaft having an axis parallel to the main shafts, and wherein the pair of main shafts are coaxially provided with respective clutches for permitting/interrupting the transmission of power from a crankshaft (see, for example, Japanese Patent Laid-Open No. 2008-303939). This configuration is advantageous over the case where a pair of clutches are coaxially overlappingly arranged, in that an increase in the width in the axial direction of the power unit can be suppressed.

Meanwhile, the vehicle power unit having a pair of main shafts and a pair of clutches on different axes as in the related art has a problem that since the space for layout of each of the shafts in it tends to be increased as compared with a power unit having main shafts and clutches in a coaxial fashion, it influences the vehicle body size when used as a power unit for a small-type vehicle (saddle type vehicle) such as a motorcycle.

In addition, in a saddle type vehicle such as a motorcycle, a swing arm is mounted rearwardly of a crankcase at a front portion thereof through a pivot shaft so as to be swingable upward and downward, and a rear wheel as a drive wheel is rotatably supported on a rear portion thereof. In this case, a power unit having two main shafts tends to have a long distance from the crankshaft to the pivot shaft, and, when one of the main shafts is disposed rather on the upper side and the other rather on the lower side so as to prevent the distance from increasing, the degree of freedom in laying out the peripheral parts is lowered.

Accordingly, it is an object of the present invention, in a saddle type vehicle having mounted thereon a power unit including a twin clutch type transmission having a pair of main shafts and a pair of clutches along different axes, to enable a compact layout of axes and to contrive reductions in size of the unit and its surroundings.

SUMMARY AND OBJECTS OF THE INVENTION

According to an embodiment of the present invention, a saddle type vehicle (1) including a power unit (10) which has: a crankshaft (21); first and second main shafts (31, 32) disposed in this order from the crankshaft (21) side; a single counter shaft (35) engaged with both the main shafts (31, 32); a crankcase (14) on which the crankshaft (21), the main shafts (31, 32) and the counter shaft (35) are rotatably borne in parallel to one another; first and second clutches (33, 34) disposed respectively at end portions of the main shafts (31, 32) and individually permitting/interrupting transmission of rotational power from the crankshaft (21) to the main shafts (31, 32); and gear trains (36a, 36c, 36e, 37b, 37d, 370) for a plurality of gear speeds which are provided on the main shafts (31, 32) and the counter shaft (35) and are selectively established by rotation of a shift drum (52) parallel to the shafts (31, 32, 35), with a shift position being changed by changing over engaged/disengaged states of the clutches (33, 34), and with power being transmitted from an end portion of the counter shaft (35) that protrudes from the crankcase (14) to a drive wheel (11), and a swing arm (9) supporting the drive wheel (11) on a rear portion thereof, and a pivot shaft (27) which is disposed rearwardly of the crankcase (14) in parallel to the shafts (31, 32, 35) and by which the swing arm (9) is supported at a front portion thereof so as to be swingable upward and downward.

An axis center (C3) of the first main shaft (31) is disposed rearwardly of an axis center (C2) of the crankshaft (21) and forwardly of an axis center (C5) of the counter shaft (35), and an axis center (C4) of the second main shaft (32) is disposed rearwardly of the axis center (C5) of the counter shaft (35) and forwardly of an axis center (C7) of the pivot shaft (27).

Incidentally, the saddle type vehicle generally includes those vehicles in which the driver is seated astride a vehicle body; thus, it includes not only two-wheeled vehicles (inclusive of scooter type vehicles) but also three-wheeled vehicles (inclusive of two-front-wheel one-rear-wheel vehicles as well as one-front-wheel two-rear-wheel vehicles) and four-wheeled vehicles.

According to an embodiment of the present invention, the axis center (C3) of the first main shaft (31) is disposed below the axis centers (C2, C7) of the crankshaft (21) and the pivot shaft, and the axis center (C4) of the second main shaft (32) is disposed above the axis centers (C2, C7) of the crankshaft (21) and the pivot shaft (27).

According to an embodiment of the present invention, the axis center (C5) of the counter shaft (35) is disposed above the axis center (C7) of the pivot shaft (27).

According to an embodiment of the present invention, the shafts (31, 32, 35) are so disposed that a shaft disposed on a more rearward side is located at a higher position.

According to an embodiment of the present invention, at least a part of a rear portion of the crankcase (14) in which the second clutch (34) is contained is disposed above the pivot shaft (27).

According to an embodiment of the present invention, at least a part of the second clutch (34) is disposed above the pivot shaft (27).

According to an embodiment of the present invention, at least a part of the outside diameter of the second clutch (34) is disposed forwardly of the axis center (C5) of the counter shaft (35).

According to an embodiment of the present invention, one (C4) of the axis centers (C3, C4) of the main shafts (31, 32) is disposed above a line (BL) interconnecting the axis center (C2) of the crankshaft (14) and the axis center (C7) of the pivot shaft (27), while the other (C3) is disposed below the line (BL); and the clutches (33, 34) are so disposed that at least certain parts of them overlap each other in an upper-lower relation.

According to an embodiment of the present invention, the shift drum (52) is disposed above the first clutch (33) and forwardly of the second clutch (34).

According to an embodiment of the present invention, the first main shaft (31) is disposed nearer to the crankshaft (21) than the counter shaft (35), odd-numbered speed drive gears (38a, 38c, 38e) in the gear trains (36a, 36c, 36e, 37b, 37d, 37f) are disposed on the first main shaft (31), and even-numbered speed drive gears (38b, 38d, 38f) in the gear trains (36a, 36c, 36e, 37b, 37d, 37f) are disposed on the second main shaft (32).

According to an embodiment of the present invention, rotational power of the crankshaft (21) is inputted to the first main shaft (31) through primary gears (22, 45) and inputted from the primary gears (22, 45) to the second main shaft (32) through an idle gear (47).

According to an embodiment of the present invention, the idle gear (47) is supported on the counter shaft (35) located between the main shafts (31, 32).

According to an embodiment of the present invention, a generator (G) supported on one end of the crankshaft (21); and a generator room (GR) which is provided in the crankcase (14) and in which the generator (G) is contained, and a first speed gear (38a) which is the smallest in diameter of the odd-numbered speed drive gears (38a, 38c, 38e) and the generator room (GR) overlap each other as viewed along the axial direction of the crankshaft (21).

According to an embodiment of the present invention, a fifth speed gear (38e) which is the largest in diameter of the odd-numbered speed drive gears (38a, 38c, 38e) and a crank bearing (24) overlap each other as viewed along the axial direction of the crankshaft (21).

According to an embodiment of the present invention, a crank web (21) of the crankshaft (21) is provided with a cutout (cut) for avoiding at least one (38c) of the odd-numbered speed drive gears (38a, 38c, 38e).

Effects of the invention include the following:

According to an embodiment of the present invention, in the power unit having a pair of main shaft and a pair of clutches, the height size of the crankcase can be made small by distributing or arranging the main shafts and the clutches on the front and rear sides. This ensures that a space for layout of an intake system and the like can be easily secured on the upper side of the crankcase, and the amount of downward projection of the crankcase can be suppressed.

According to an embodiment of the present invention, the main shafts and the clutches can be distributed (i.e., arranged) on the upper and lower sides between the crankshaft and the pivot shaft. Consequently, the distance from the crankshaft to the pivot shaft can be shortened, and the periphery of the power unit (and hence the vehicle body of the completed vehicle) can be formed to be compact in the back-and-forth direction.

According to an embodiment of the present invention, even in taking out power from the counter shaft to the outside of the power unit, the output part and the pivot shaft can be easily disposed close to each other, and the amount of swinging of the swing arm can be easily secured.

According to an embodiment of the present invention, the pivot shaft can be easily disposed rearwardly of the crankcase and at a height comparable to that of the crankshaft.

According to an embodiment of the present invention, the back-and-forth length of the crankcase can be made small by disposing the second clutch rather near the counter shaft side.

According to an embodiment of the present invention, the back-and-forth length of the space for containing the clutches, and hence of the crankcase, can be shortened, and the distance from the crankshaft to the pivot shaft can be shortened.

According to an embodiment of the present invention, the clutches and the shift drum which are displaced in the vertical direction can be disposed in a compact fashion.

According to an embodiment of the present invention, the odd-numbered speed drive gears are smaller than the even-numbered speed drive gears in diameter on the whole. With the odd-numbered speed drive gears disposed on the first main shaft near the crankshaft, therefore, it becomes easy to suppress interference, particularly between the crank web of the crankshaft and the drive gears on the first main shaft. Consequently, it is possible to shorten the distance between the axis of the crankshaft and the axis of the first main shaft and thereby to achieve a reduction in the size of the unit as a whole.

According to an embodiment of the present invention, rotational power of the crankshaft can be efficiently transmitted to the second main shaft, which is located farther from the crankshaft than the first main shaft, through the idle gear supported on the counter shaft located between the main shafts.

According to an embodiment of the present invention, a configuration wherein the first speed gear of a comparatively small diameter is opposed to the generator and the generator room provided in comparatively large diameter on one end side of the crankshaft ensures that interference between the generator room and the drive gears supported on the first main shaft can be suppressed while disposing the first main shaft and the crankshaft close to each other.

According to an embodiment of the present invention, a configuration in which the fifth speed gear of a comparatively large diameter is opposed to the crank bearing provided in a comparatively small diameter in the periphery of the crankshaft ensures that interference between the periphery of the crankshaft and the drive gears supported on the first main shaft can be suppressed while disposing the first main shaft and the crankshaft close to each other.

According to an embodiment of the present invention, the first main shaft and the crankshaft can be disposed as close to each other as possible.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now, an embodiment of the present invention will be described below referring to the drawings. Incidentally, the directions such as forward, rearward, leftward (left) and rightward directions in the following description are the same as those with reference to the vehicle described below, unless otherwise specified. Besides, at appropriate parts in the drawings used in the following description, arrow FR indicative of the front side of the vehicle, arrow LH indicative of the left-hand side of the vehicle and arrow UP indicative of the upper side of the vehicle are shown.

Figure 1:
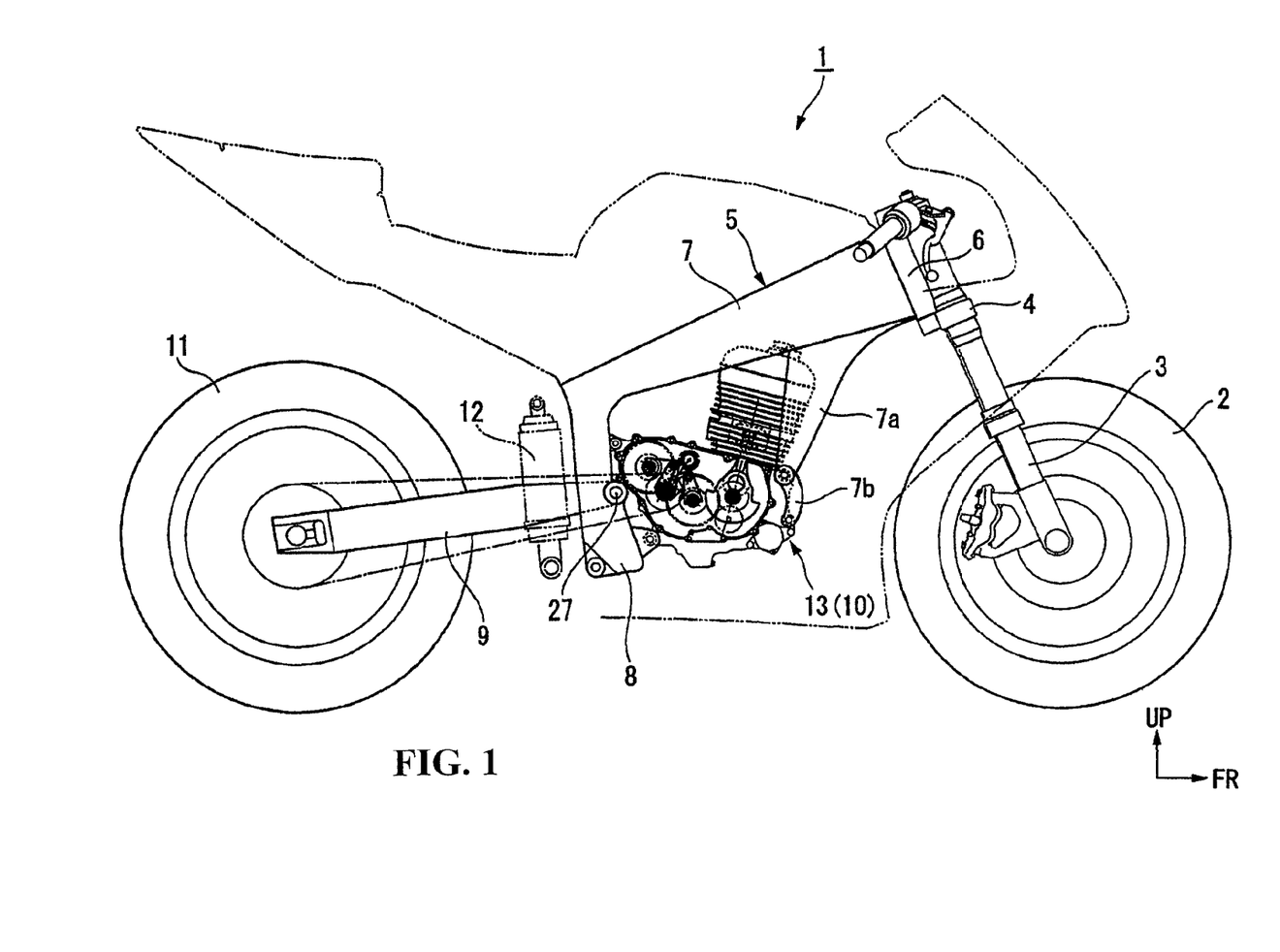
FIG. 1 is a right side view of a motorcycle according to an embodiment of the present invention.

In a motorcycle (saddle type vehicle) 1 shown in FIG. 1, a front wheel 2 is rotatably borne on a front fork 3, which is steerably supported at an upper portion thereof on a head pipe 6 at a front end portion of a body frame 5 through a steering stem 4. A main frame 7 obliquely extends downwardly rearward from the head pipe 6, and a pivot frame 8 is connected at an upper end portion thereof to a rear end portion of the main frame 7. A swing arm 9 is rotatably supported at a front end portion thereof on a vertically intermediate portion of the pivot frame 8 so as to be swingable upward and downward, and a rear wheel 11 is rotatably borne on a rear end portion of the swing arm 9. A cushion unit 12 is interposed between a front portion of the swing arm 9 and a rear portion of the body frame 5. Incidentally, in the drawing, reference symbol 27 denotes a pivot shaft as a swinging shaft of the swing arm 9, reference symbol 7a denotes a down frame obliquely extending downwardly rearward from a front portion lower side of the main frame 7, and reference symbol 7b denotes a hanger bracket attached to a tip portion of the down frame 7a.

On the body frame 5, a power unit 10 is mounted which is a power engine of the motorcycle 1.

Figure 2:
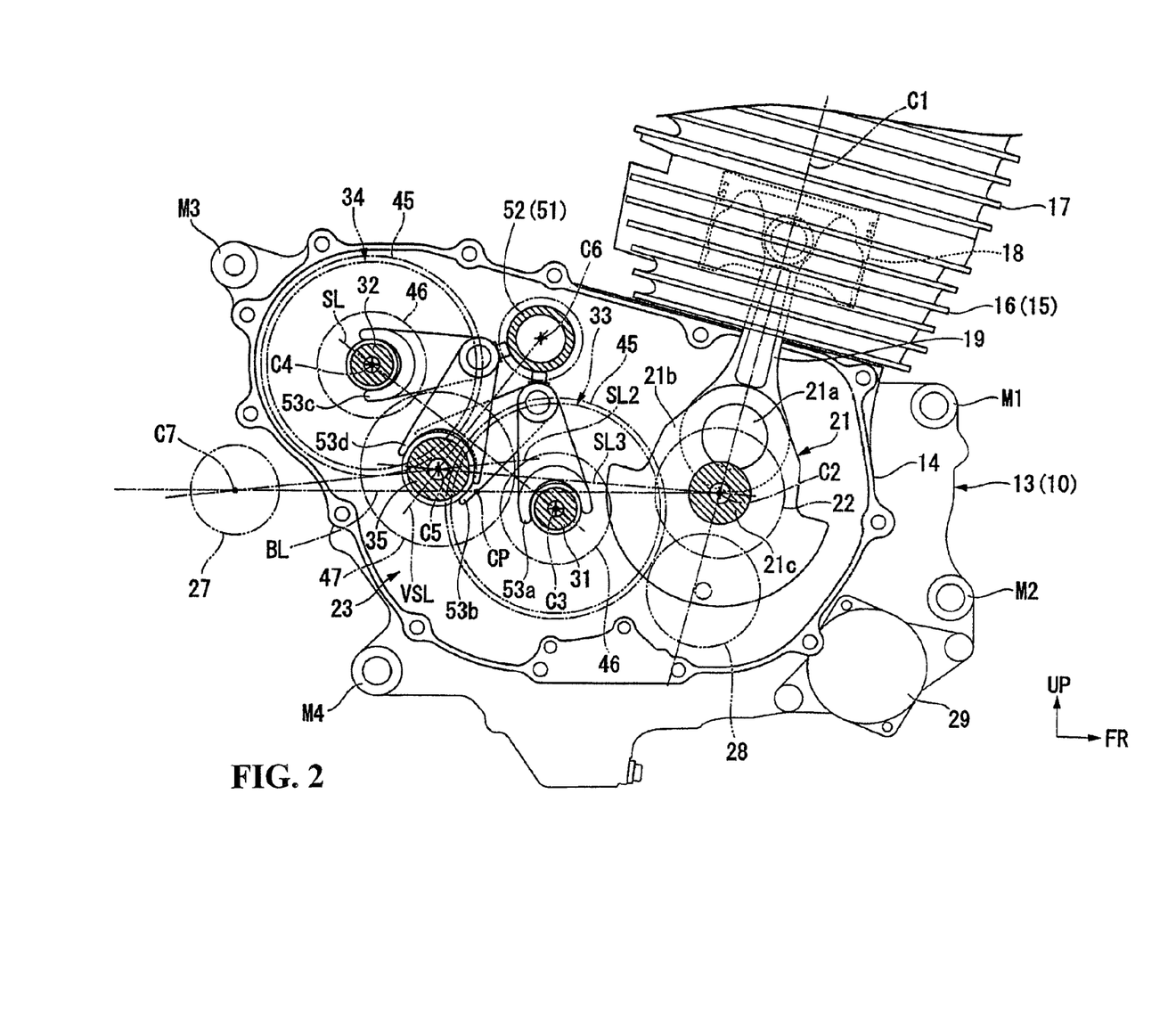
FIG. 2 is a right side view of a power unit of the motorcycle.

Referring to FIG. 2 as well, the power unit 10 integrally includes an air-cooled single-cylinder engine (hereafter, referred to simply as engine) 13 constituting a front portion thereof and a twin clutch type transmission (hereafter, referred to simply as transmission) 23 continuously provided on the rear side of the engine 13.

The engine 13 has a basic configuration in which a cylinder 15 on the crankcase 14 is provided in an erect posture of being inclined to the front side relative to the vertical direction. Incidentally, reference symbol C1 in the drawing denotes the cylinder axis along the erection direction of the cylinder 15. The power unit 10 is fixedly supported on the body frame 5 by a method in which upper and lower parts of a front end portion of the crankcase 14 are mounted respectively to the down frame 7a and a lower end portion of the hanger bracket 7b, by bolt fastening or the like, whereas upper and lower parts of a rear end portion of the crankcase 14 are mounted respectively to upper and lower portions of the pivot frame 8 by bolt fastening or the like. Incidentally, in the drawing, reference symbols M1 and M2 denote front frame fixing portions at the upper and lower parts of the front end portion of the crankcase 14, while reference symbols M3 and M4 denote rear frame fixing portions at the upper and lower parts of the rear end portion of the crankcase 14.

The cylinder 15 has a cylinder body 16, a cylinder head 17 and a head cover 17a (see FIG. 5) in this order from the crankcase 14 side. Intake system parts (not shown) are connected to a rear portion (intake side) of the cylinder head 17, whereas exhaust system parts (not shown) are connected to a front portion (exhaust side) of the cylinder head 17.

A piston 18 reciprocated along the cylinder axis C1 is fitted in the cylinder body 16, and a reciprocating motion of the piston 18 is converted through a connecting rod 19 into a rotating motion of a crankshaft 21.

Figure 3:
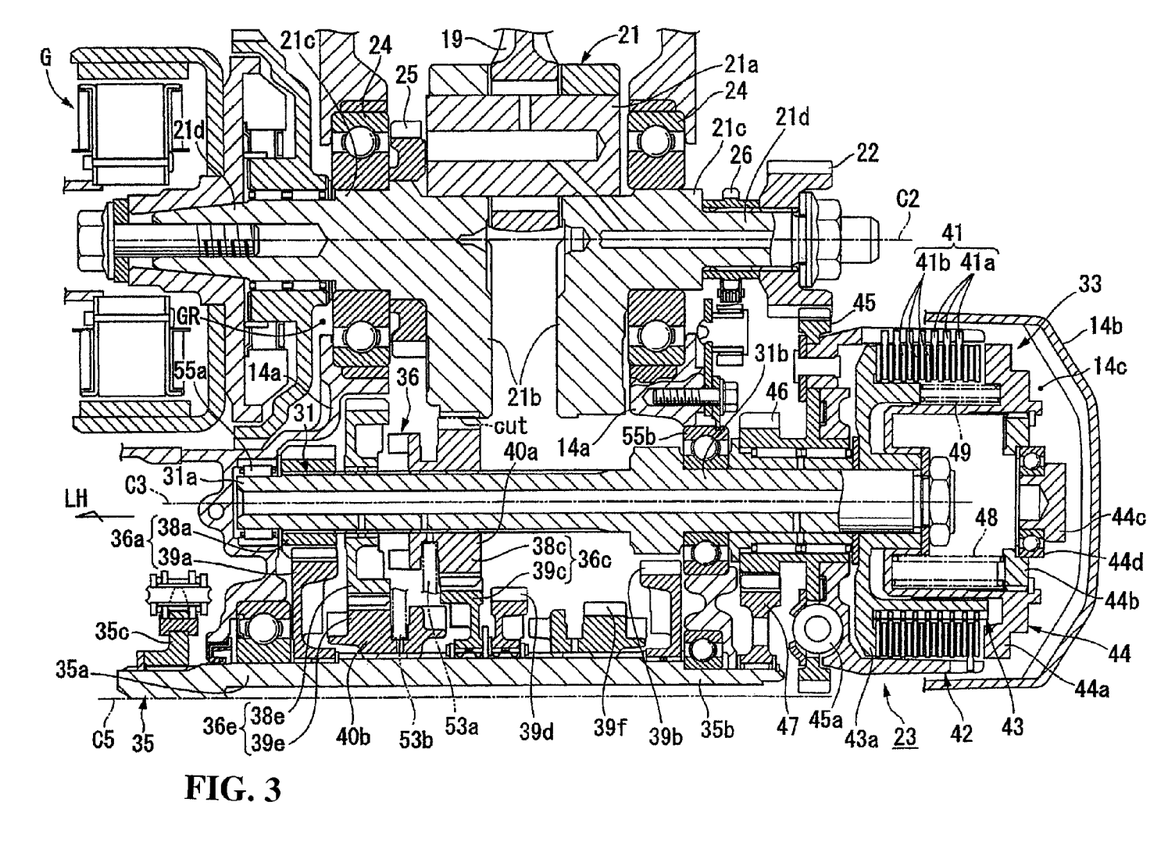
FIG. 3 is a sectional view, taken in parallel to axes, of crankshafts and the periphery of a first main shaft of the power unit.

As shown in FIGS. 2 and 3, the crankshaft 21 includes a pair of left and right crank webs 21b which support a crank pin 21a, left and right journal portions 21c projecting to the left and right outer sides from the left and right crank webs 21b, and left and right support shafts 21d extending further to the left and right outer sides from the left and right journal portions 21c. A rotor of an alternator (not shown) is integrally rotatably supported on the left support shaft 21d. A primary drive gear 22 for transmission of power to the transmission 23 is integrally rotatably supported on the right support shaft 21d.

Incidentally, in FIG. 3, reference symbol C2 denotes a rotational center axis (crank axis) along the left-right direction in the crankshaft 21 (the left and right journal portions 21c); reference symbols 24 denote left and right radial ball bearings by which the left and right journal portions 21c are rotatably borne on left and right side wall portions 14a of the crankcase 14; reference symbol 25 denotes an oil pump drive gear supported between the left crank web 21b and the left journal portion 21c so as to be rotatable as one body with them; and reference symbol 26 denotes a cam drive sprocket supported between the right journal portion 21c and the primary drive gear 22 so as to be rotatable as one body with them. Reference symbol GR denotes a generator room formed at a left side portion of the crankcase 21 so as to contain a generator G.

In addition, in FIG. 2, reference symbol 27 denotes the pivot shaft set along the left-right direction to support a front end portion of the swing arm 9; reference symbol C7 denotes a swinging center axis (pivot axis) set along the left-right direction in the pivot shaft 27; reference symbol 28 denotes an oil pump disposed under the crankshaft 21 in the crankcase 14; and reference symbol 29 denotes a starter motor mounted to the lower side of a front end portion of the crankcase 14.

Referring to FIG. 2, the transmission 23 provided in a power transmission path between the engine 13 and the drive wheel and a change mechanism 51 operative to change the shift position in the transmission 23 are contained in a rear portion of the crankcase 14. Rotational power of the crankshaft 21 is outputted through the transmission 23 to the left side of a rear portion of the crankcase 14, before being transmitted to the rear wheel 11 through, for example, a chain type power transmission mechanism.

Figure 4:
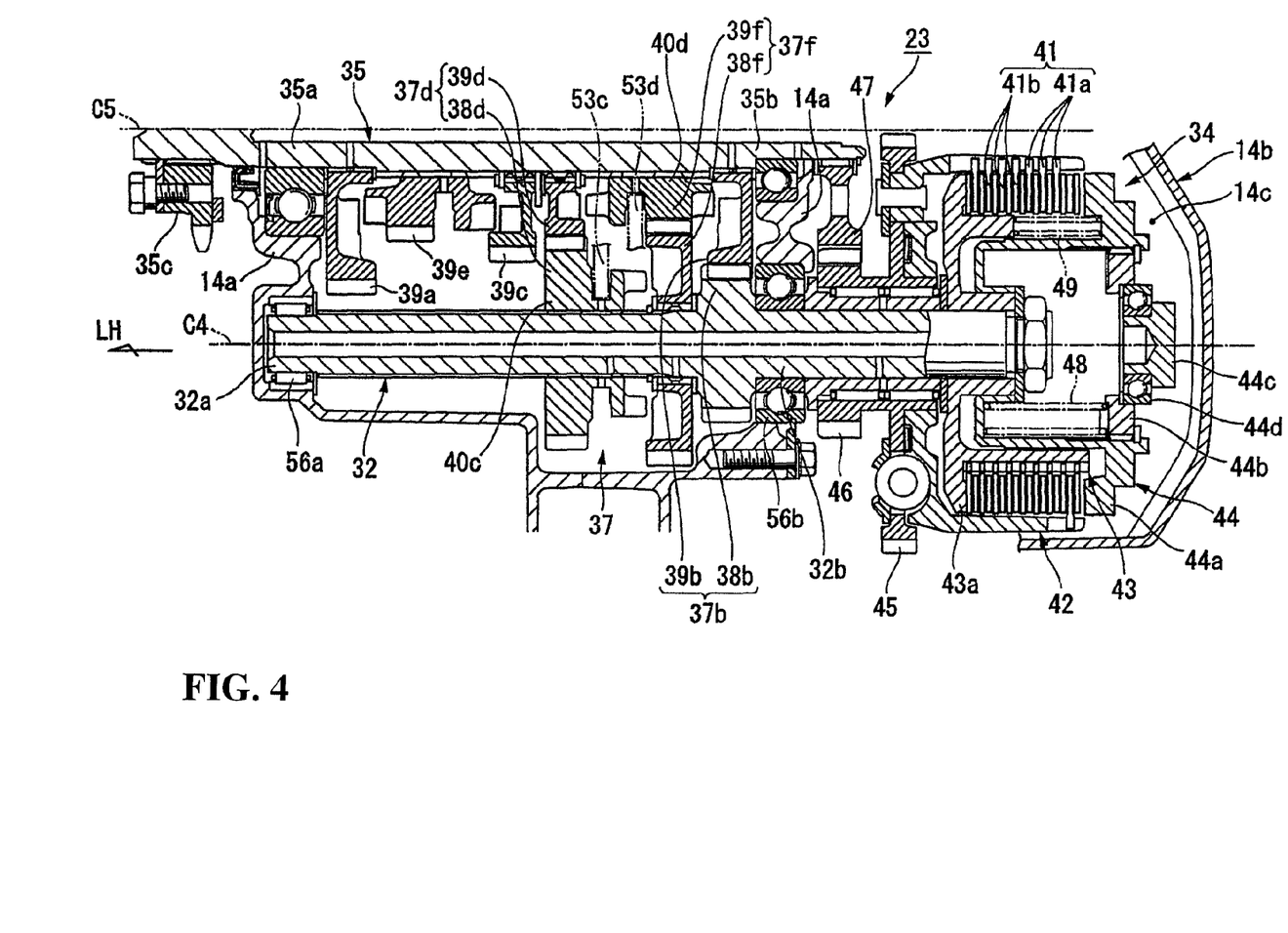
FIG. 4 is a sectional view, taken in parallel to axes, the periphery of a second main shaft of the power unit.

Referring to FIGS. 3 and 4 as well, the transmission 23 includes: first and second main shafts 31 and 32 extending along the left-right direction in parallel to each other and on different axes; first and second clutches 33 and 34 respectively coaxially supported at right end portions of the main shafts 31 and 32; a single counter shaft 35 extending along the left-right direction in parallel to the main shafts 31 and 32 and on an axis different from main shaft axes; a first transmission gear group 36 provided ranging between the first main shaft 31 and the counter shaft 35; and a second transmission gear group 37 provided ranging between the second main shaft 32 and the counter shaft 35. The first transmission gear group 36 is composed of a plurality of gear trains (gear pairs) for odd-numbered gear speeds, while the second transmission gear group 37 is composed of a plurality of gear trains (gear pairs) for even-numbered gear speeds. Incidentally, reference symbols C3, C4 and C5 in the drawings denote rotational center axes (a first main axis, a second main axis and a counter axis) along the left-right directions in the main shafts 31 and 32 and the counter shaft 35.

The transmission 23 is capable of transmitting power by selective use of one of the gear trains. In a normal operation wherein the shift position (gear speed) is constant, one of the clutches 33 and 34 is put in an engaged state whereas the other is put in a disengaged state, and power transmission is conducted using that one of the gear trains which is connected with the clutch being in the engaged state. A gear shift between an odd-numbered gear speed and an even-numbered gear speed is conducted by a method wherein a condition permitting power transmission by use of a gear train preselected from the gear trains in connection with the disengaged clutch is produced, and, starting from this condition, the engaged clutch is brought into a disengaged state whereas the disengaged clutch is brought into an engaged state (the engaged/disengaged states of the clutches 33 and 34 are changed over).

Referring to FIGS. 3 and 4, the clutches 33 and 34 are wet-type multiple disc clutches each having a plurality of clutch plates 41 alternately stackedly arranged in the axial direction, and are contained in the inside of a right side portion (clutch chamber 14c) of the crankcase 14. Incidentally, reference symbol 14b in the drawings denotes a clutch cover which covers the clutch chamber 14c.

Figure 5:
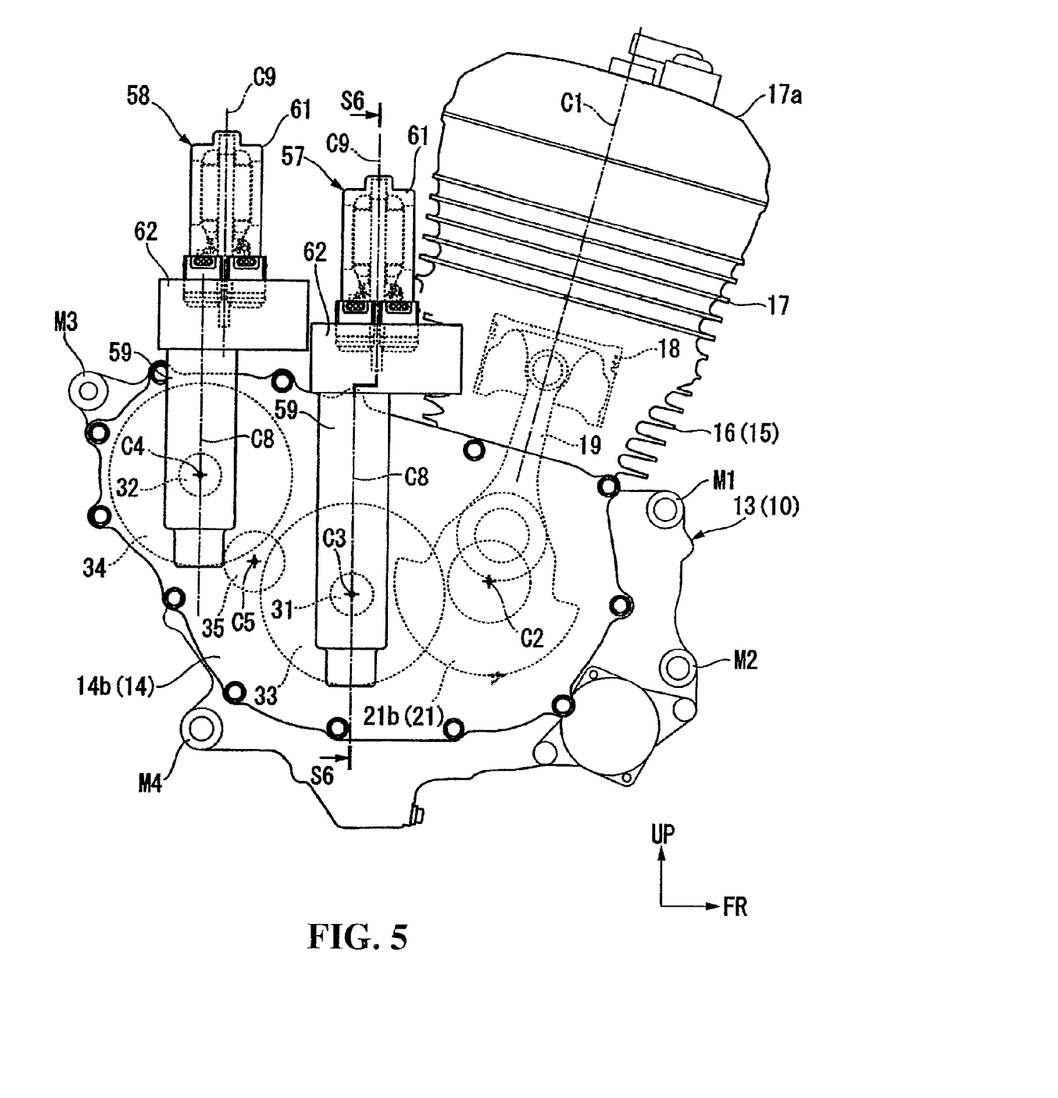
FIG. 5 is a right side view of a part including a clutch actuator of the power unit.
Figure 6:
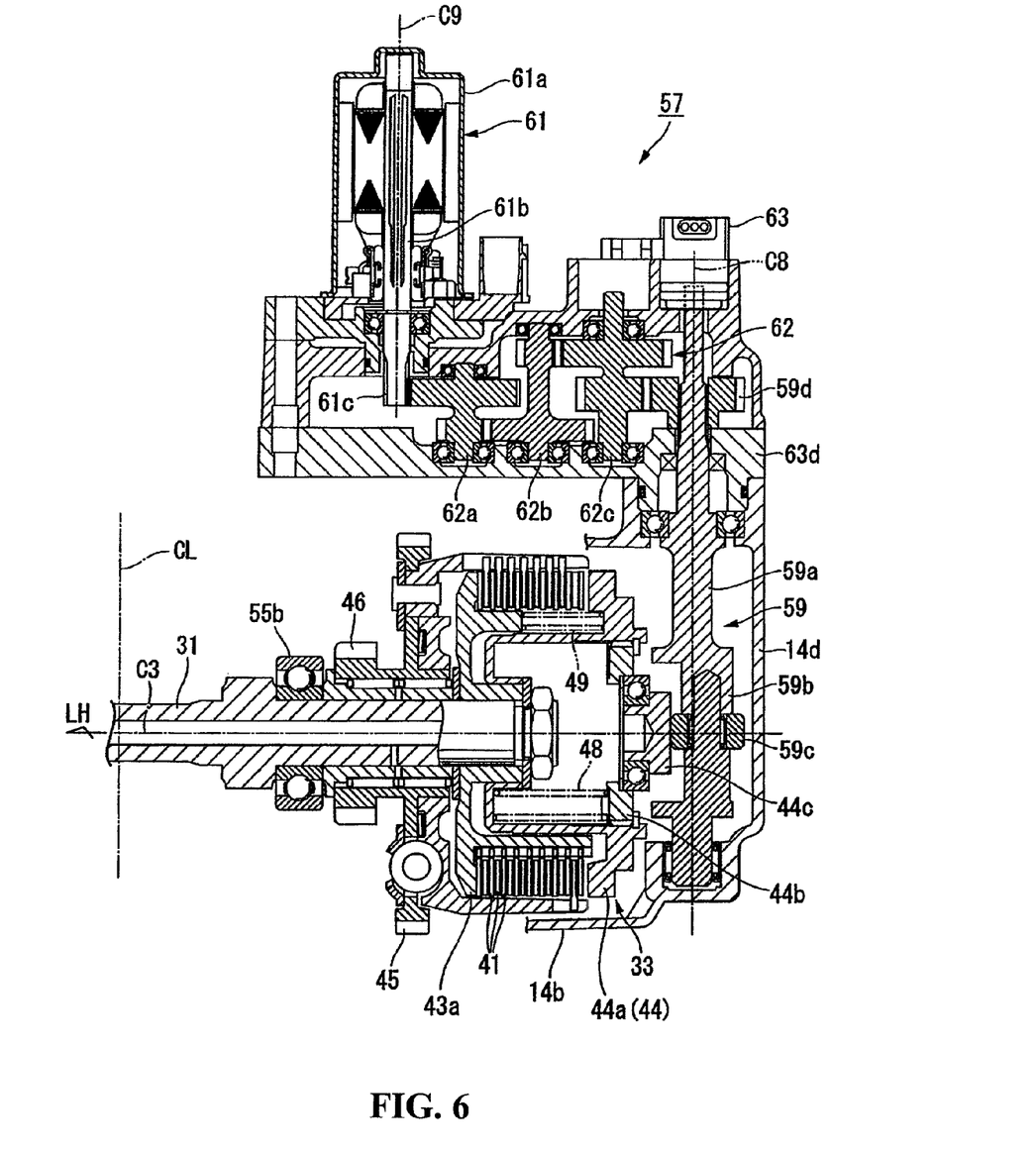
FIG. 6 is a sectional view taken along line S6-S6 of FIG. 5.

The clutches 33 and 34 are of a mechanical system in which the clutch plates 41 are put into frictional engagement under pressures supplied respectively from individual clutch actuators 57 and 58 (see FIGS. 5 and 6). Incidentally, for convenience of drawing, the clutch actuators 57 and 58 are omitted in FIGS. 3 and 4.

The clutches 33 and 34 are laid out so that they do not overlap each other in side view, whereby an increase in the left-right width of the power unit 10 is suppressed (see FIG. 2). The clutches 33 and 34 are so laid out as to avoid the journal portions 21c of the crankshaft 21 and the pivot shaft 27 in side view. The clutches 33 and 34 are disposed at positions as high as possible for the purpose of suppressing raking-up of an engine oil.

The second clutch 34 located in a rear portion of the crankcase 14 is so laid out that the pivot shaft 27 can be disposed on the lower rear side of the second clutch 34, and, in order to make smaller the back-and-forth length of the unit as a whole, the second clutch 34 is largely displaced upward from the counter shaft 35, and a front end portion of the second clutch 34 is located forwardly of the axis C5 of the counter shaft 35. That part of the rear portion of the crankcase 14 which contains the second clutch 34 is projecting to the upper side of the pivot shaft 27, together with the second clutch 34.

A rear portion of the first clutch 33 and a front portion of the second clutch 34 overlap each other on the basis of back-and-forth-directional position, and an upper portion of the first clutch 33 and a lower portion of the second clutch 34 overlap each other on the basis of vertical position.

In addition, a rear portion of the second clutch 34 and a front portion of the pivot shaft 27 overlap each other on the basis of back-and-forth-directional position, and a lower portion of the second clutch 34 and an upper portion of the pivot shaft 27 overlap each other on the basis of vertical position.

The transmission 23 is of a normally meshed type in which a drive gear and a driven gear, pertaining to one of the gear speeds, are normally meshed with each other. The gears are largely classified into free gears which can each be rotated relative to the shaft for supporting thereof and slide gears which are each spline-fitted to the shaft for supporting thereof. Of the gears, the slide gear is moved in the axial direction by an operation of the change mechanism 51, resulting in a gear change to power transmission by using a gear train according to one of the gear speeds.

Referring to FIG. 2, the first main shaft 31 is so laid out that its axis C3 is located rearwardly of and slightly below the crank axis C2. More in detail, the first main axis C3 is so laid out that it is below a substantially horizontal reference straight line BL interconnecting the crank axis C2 and the pivot axis C7 and that it is close to the reference straight line BL to such an extent that a top portion of the first main shaft 31 intersects the reference straight line BL, in side view.

The second main shaft 32 is so laid out that its axis C4 is located on an obliquely rear upper side of the first main axis C3 and located on an obliquely front upper side of the pivot axis C7. More specifically, the second main axis C4 is located at such a height that it is above the reference straight line BL and a visible outline of the second clutch 34 is separate from the reference straight line BL, in side view.

The counter shaft 35 is so laid out that its axis C5 is located rearwardly of and slightly above the first main axis C3. More in detail, the counter axis C5 is so laid out that it is above the reference straight line BL and it is close to the reference straight line BL to such an extent that a bottom portion of the counter shaft 35 intersects the reference straight line BL, in side view.

The counter axis C5 is so laid out that it is located below, in a direction orthogonal to, a rear-up slant line SL interconnecting the main axes C3 and C4, in side view. The shafts 31, 32, and 35 are disposed in the order of the first main shaft 31, the counter shaft 35 and the second main shaft 32 in a rearward direction from the crankshaft 21, in such a manner that a shaft spaced more rearward from the crankshaft 21 is located at a higher position. Incidentally, reference symbol VSL in the drawing denotes a slant orthogonal line which is passing the counter axis C5 and is orthogonal to the slant line SL. The slant orthogonal line VSL corresponds to the perpendicular bisector of the slant line SL.

Thus, the second main shaft 32 and the second clutch 34 disposed in the rear portion of the crankcase 14 while separated rearwardly from the crankshaft 21 are disposed at comparatively high positions, whereby it is made possible to dispose the pivot shaft 27 at a vertical position comparable to that of the crankshaft 21 and on a rear lower side of the crankcase 14. It is also made possible to dispose the pivot shaft 27 at a position as more forward side (the crankshaft 21 side) as possible (in other words, to shorten the distance between the axis of the pivot shaft 27 and the axis of the crankshaft 21).

Here, in relation to a rear-down second slant line SL2 interconnecting the pivot axis C7 and the counter axis C5, in side view, the first main axis C3 is laid out on the lower side, and the second main axis C4 on the upper side. Similarly, in relation to a rear-up third slant line SL3 interconnecting the crank axis C2 and the counter axis C5, in side view, the first main axis C3 is disposed on the lower side, and the second main axis C4 on the upper side.

Above the first main shaft 31 and forwardly of the second main shaft 32, a shift drum 52 of the change mechanism 51 is laid out.

The change mechanism 51 includes the hollow cylindrical shift drum 52 parallel to the shafts 31, 32, and 35, and four shift forks 53a to 53d which are engaged respectively with four lead grooves (not shown) formed in the outer periphery of the shift drum 52. By rotation of the shift drum 52, the shift forks 53a to 53d are individually moved in the axial direction according to patterns of the lead grooves, thereby individually moving shifters 40a to 40d (described later) of the transmission 23 in the axial direction. This results in that the gears to be used for power transmission between one of the main shafts 31 and 32 and the counter shaft 35 in the transmission 23 is appropriately selected (established as power transmission elements).

Incidentally, reference symbol C6 in the drawing denotes rotational center axis (drum axis) along the left-right direction of the shift drum 52. The drum axis C6 is so laid out as to be located on the upper side of, in a direction orthogonal to, the slant line SL in side view. The drum axis C6, together with the counter axis C5, is located on the slant orthogonal line VSL in side view. The drum axis C6 is spaced from the slant line SL more than the counter axis C5. The shift forks 53a to 53d are provided roughly in line symmetry with reference to the slant orthogonal line VSL, in side view.

Referring to FIG. 3, a left end portion of the first main shaft 31 is rotatably borne on the left side wall portion 14a of the crankcase 14 through a left radial needle bearing 55a, and a right end portion of the first main shaft 31 is rotatably borne on the right side wall portion 14a of the crankcase 14 through a right radial ball bearing 55b. On that extension portion of the first main shaft 31 which extends to the right side of the right radial needle bearing 55b, the first clutch 33 is supported coaxially.

Referring to FIG. 4, a left end portion of the second main shaft 32 is rotatably borne on the left side wall portion 14a of the crankcase 14 through a left radial needle bearing 56a, and a right end portion of the second main shaft 32 is rotatably borne on the right side wall portion 14a of the crankcase 14 through a right radial ball bearing 56b. On that extension portion of the second main shaft 32 which extends to the right side of the right radial ball bearing 56b, the second clutch 34 is supported coaxially.

Referring to FIG. 3, the first clutch 33 includes: a clutch outer 42 which has a bottomed hollow cylindrical shape coaxial with the first main shaft 31 and is relatively rotatably borne on the first main shaft 31 so as to normally transmit rotational power between itself and the crankshaft 21; a clutch inner 43 which also has a bottomed hollow cylindrical shape similar to the clutch outer 42, is coaxially disposed on the inner periphery side of the clutch outer 42 and is integrally rotatably supported on the first main shaft 31; the plurality of clutch plates 41 stacked in the axial direction between the cylindrical walls of the clutch outer 42 and the clutch inner 43; and a pressure unit 44 which is coaxially disposed on the open side of the clutch inner 43 and presses the stacked clutch plates 41 (hereafter, sometimes referred to as clutch plate group 41) leftward.

To the left side of a bottom wall of the clutch outer 42, a large-diameter power transmission gear (primary driven gear) 45 larger than the bottom wall in diameter is mounted through a damper 45a. The large-diameter power transmission gear 45 is to be meshed with the primary drive gear 22 provided on a right end portion of the crankshaft 21. At the left on the inner periphery side of the large-diameter power transmission gear 45, a small-diameter power transmission gear 46 having a relatively small diameter is integrally formed. The small-diameter power transmission gear 46 is to be meshed with an idle gear 47 which is rotatably borne on a right end portion of the counter shaft 35. The idle gear 47 is meshed also with a large-diameter power transmission gear 45 of the second clutch 34 which will be described later.

On the inner periphery side of the hollow cylindrical wall of the clutch outer 42, those of the clutch plates 41 (clutch discs 41a) which are supported by the clutch outer 42 are supported in an integrally rotatable and axially movable manner. On the outer periphery side of the hollow cylindrical wall of the clutch inner 43, those of the clutch plates 41 (clutch plates 41b) which are supported by the clutch inner 43 are supported in an integrally rotatable and axially movable manner. With the outer periphery of the bottom wall of the clutch inner 43, a left pressure flange 43a is formed integrally. The left pressure flange 43a is adjacent to the left of a left side surface of the clutch plate group 41.

On the other hand, a right pressure flange 44a of the pressure unit 44 is adjacent to the right of a right side surface of the clutch plate group 41, and the right pressure flange 44a is moved leftward by operation of clutch actuators 57 and 58 which will be described later. Consequently, the clutch plate group 41 is clamped under pressure between the left and right pressure flanges 43a and 44a so as to be integrally put into frictional engagement, resulting in a clutch engagement state in which torque transmission is possible between the clutch outer 42 and the clutch inner 43. On the other hand, when the right pressure flange 44a is moved rightward, the frictional engagement is released, resulting in a clutch disengagement state in which the torque transmission is impossible.

The pressure unit 44 includes: the right pressure flange 44a rotatable as one body with the clutch inner 43; a pressure ring 44b which is disposed on the inner periphery of a right end portion of the right pressure flange 44a and is capable of pressing the right pressure flange 44a leftward through a clutch spring 48; and a pressure cap 44c which is relatively rotatably engaged with the inner periphery of the pressure ring 44b through a radial ball bearing 44d and is capable of pressing the pressure ring 44b leftward.

A turning shaft 59a (cam shaft) of each of the clutch actuators 57 and 58 described later is disposed on the right side of the pressure cap 44c. When the turning shaft 59a presses the pressure cap 44c, the pressure ring 44b and the right pressure flange 44a leftward, the clutch plate group 41 is put into frictional engagement. On the other hand, when the pressure described is released, and the right pressure flange 44a is moved rightward by an action of a return spring 49 provided between the right pressure flange 44a and the clutch inner 43, the frictional engagement is released.

Incidentally, the second clutch 34 is configured in the same manner as the first clutch 33 (see FIG. 4); therefore, the same parts as the parts of the first clutch 33 described above are denoted by the same reference symbols as used above, and detailed descriptions thereof will be omitted.

Referring to FIGS. 2 to 4, rotational power is inputted from the primary drive gear 22 (the crankshaft 21) to the large-diameter power transmission gear 45 of the clutch outer 42 of the first clutch 33.

On the other hand, rotational power of the crankshaft 21 is transmitted to the clutch outer 42 of the second clutch 34 sequentially through the primary drive gear 22, the large-diameter power transmission gear 45 of the first clutch 33, the small-diameter power transmission gear 46 of the first clutch 33, the idle gear 47, the small-diameter power transmission gear 46 of the second clutch 34, and the large-diameter power transmission gear 45 of the second clutch 34.

The transmission gear groups 36 and 37 constitute gear positions for a total of six gear speeds.

The first transmission gear group 36 constitutes first, third and fifth speed gear trains 36a, 36c, and 36e corresponding to odd-numbered gear speeds (first speed, third speed, and fifth speed), and is provided ranging between right side portions of the first main shaft 31 and the counter shaft 35.

On the other hand, the second transmission gear group 37 constitutes second, fourth and sixth speed gear trains 37b, 37d, and 37f corresponding to even-numbered gear speeds (second speed, fourth speed, and sixth speed), and is provided ranging between left side portions of the second main shaft 32 and the counter shaft 35.

With one of the gear trains in the transmission gear groups 36 and 37 selectively established, rotational power of the crankshaft 21 inputted to one of the main shafts 31 and 32 is transmitted to the counter shaft 35 after being reduced in speed in a predetermined reduction gear ratio.

The first speed gear train 36a is composed of a first speed drive gear 38a which is adjacently provided on the right side of and integrally rotatably supported on a left end portion (a left journal portion 31a borne on the crankcase 14) of the first main shaft 31, and a first speed driven gear 39a which is adjacently provided on the right side of and relatively rotatably supported on a left end portion (a left journal portion 35a borne on the crankcase 14) of the counter shaft 35.

A right end portion of the first main shaft 31 forms a right journal portion 31b borne on the crankcase 14, and projects into the clutch chamber 14c on the right side of the crankcase 14, and the first clutch 33 is attached to this projecting portion.

In addition, a left end portion (a left journal portion 35a) of the counter shaft 35 projects to the outside of the crankcase 14, and a drive portion (in the drawing, the drive sprocket) 35c of the above-mentioned power transmission mechanism is attached to this projecting portion.

On the right side of the first speed driven gear 39a, a first shifter 40a which is rotatable as one body with the counter shaft 35 and axially movable is adjacently provided. With the first shifter 40a moved in the axial direction, it is integrally rotatably engaged with the first speed driven gear 39a, resulting in that rotational power of the crankshaft 21 inputted to the first main shaft 31 is transmitted to the counter shaft 35 with a speed reduction through the first speed gear train 36a.

The second speed gear train 37b is composed of a second speed drive gear 38b which is adjacently provided on the left side of and formed, for example, integrally with a right end portion (a right journal portion 32b borne on the crankcase 14) of the second main shaft 32, and a second speed driven gear 39b which is adjacently provided on the left side of and relatively rotatably supported on a right end portion (a right journal portion 35b borne on the crankcase 14) of the counter shaft 35.

The right end portion (the right journal portion 32b) of the second main shaft 32 projects into the clutch chamber 14c, and the second clutch 34 is attached to this projecting portion.

In addition, the right end portion (the right journal portion 35b) of the counter shaft 35 projects into the clutch chamber 14c, and the idle gear 47 is relatively rotatably supported on this projecting portion.

A left end portion of the second main shaft 32 forms a left journal portion 32a borne on the crankcase 14.

On the left side of the second speed driven gear 39b, a second shifter 40b which is rotatable as one body with the counter shaft 35 and axially movable is adjacently provided. With the second shifter 40b moved in the axial direction, it is integrally rotatably engaged with the second speed driven gear 39b, resulting in that rotational power of the crankshaft 21 inputted to the second main shaft 32 is transmitted to the counter shaft 35 with a speed reduction through the second speed gear train 37b.

The third speed gear train 36c is composed of a third speed drive gear 38c integrally rotatably supported on the left side of a left-right-directionally intermediate portion of that part (gear support part) of the first main shaft 31 which is between the left and right journal portions 31a and 31b, and a third speed driven gear 39c relatively rotatably supported on the left side of a left-right-directionally intermediate portion of that part (gear support part) between the left and right journal portions 35a and 35b of the counter shaft 35.

The third speed driven gear 39c is integrally formed on the right side of the outer periphery of a third shifter 40c which is supported on the first main shaft 31 in an integrally rotatable and axially movable manner.

On the left side of the third speed driven gear 39c, the first shifter 40a is adjacently provided. With the first shifter 40a moved in the axial direction, it is integrally rotatably engaged with the third speed driven gear 39c, resulting in that rotational power of the crankshaft 21 inputted to the first main shaft 31 is transmitted to the counter shaft 35 with a speed reduction through the third speed gear train 36c.

The third speed drive gear 38c is provided at the same left-right-directional position as the left crank web 21b. The left crank web 21b is provided at an outermost peripheral position thereof with a cutout "cut" (see FIG. 3) for avoiding the third speed drive gear 38c, whereby the first main shaft 31 and the crankshaft 21 can be disposed as close to each other as possible.

The fourth speed gear train 37d is composed of a fourth speed drive gear 38d integrally rotatably supported on the right side of a left-right-directionally intermediate portion of that part (gear support part) between the left and right journal portions 32a and 32b of the second main shaft 32, and a fourth speed driven gear 39d relatively rotatably supported on the right side of a left-right-directionally intermediate portion of a gear support part of the counter shaft 35.

The fourth speed drive gear 38d is integrally formed on the left side of the outer periphery of a fourth shifter 40d which is supported on the second main shaft 32 in an integrally rotatable and axially movable manner.

On the right side of the fourth speed driven gear 39d, the second shifter 40b is adjacently provided. With the second shifter 40b moved in the axial direction, it is integrally rotatably engaged with the fourth speed driven gear 39d, resulting in that rotational power of the crankshaft 21 inputted to the second main shaft 32 is transmitted to the counter shaft 35 with a speed reduction through the fourth speed gear train 37d.

The fifth speed gear train 36e is composed of a fifth speed drive gear 38e relatively rotatably supported on the first main shaft 31 adjacently on the right side of the first speed drive gear 38a, and a fifth speed driven gear 39e integrally rotatably supported on the counter shaft 35 adjacently on the right side of the first speed driven gear 39a.

The fifth driven gear 39e is integrally formed on the left side of the outer periphery of the first shifter 40a.

On the right side of the fifth speed drive gear 38e, a third shifter 40c is adjacently provided. With the third shifter 40c moved in the axial direction, it is integrally rotatably engaged with the fifth speed drive gear 38e, resulting in that rotational power of the crankshaft 21 inputted to the first main shaft 31 is transmitted to the counter shaft 35 with a speed reduction through the fifth speed gear train 36e.

The fifth speed drive gear 38e is the largest in diameter of those gears among the first transmission gear group 36 which are supported on the first main shaft 31, and is located at the same left-right-directional position as a left crank bearing 24. The outer periphery side of the left crank bearing 24 is smaller in diameter than a generator room GR on the left side thereof and the crank web 21b on the right side thereof, and the fifth speed drive gear 38e comparatively large in diameter is disposed on the outer periphery side of the left crank bearing 24, whereby the main shaft 31 and the crankshaft 21 can be disposed close to each other.

The sixth speed gear train 37f is composed of a sixth speed drive gear 38f relatively rotatably supported on the second main shaft 32 adjacently on the left side of the second speed drive gear 38b, and a sixth speed driven gear 39f integrally rotatably supported on the counter shaft 35 adjacently on the left side of the second speed driven gear 39b.

The sixth speed driven gear 39f is integrally formed on the right side of the outer periphery of the second shifter 40b.

On the left side of the sixth speed drive gear 38f, a fourth shifter 40d is adjacently provided. With the fourth shifter 40d moved in the axial direction, it is integrally rotatably engaged with the sixth speed drive gear 38f, resulting in that rotational power of the crankshaft 21 inputted to the second main shaft 32 is transmitted to the counter shaft 35 with a speed reduction through the sixth speed gear train 37f.

The drive gears 38a to 38f decrease in diameter in the order of from the first speed to the sixth speed, whereas the driven gears 39a to 39f increase in diameter in the order of from the first speed to the sixth speed.

Specifically, the second speed drive gear 38b is smaller than the first speed drive gear 38a in diameter, the fourth speed drive gear 38d is smaller than the third speed drive gear 38c in diameter, and the sixth speed drive gear 38f is smaller than the fifth speed drive gear 38e in diameter.

In addition, the second speed driven gear 39b is larger than the first speed driven gear 39a in diameter, the fourth speed driven gear 39d is larger than the third speed driven gear 39c in diameter, and the sixth speed driven gear 39f is larger than the fifth speed driven gear 39e in diameter.

Thus, it can be said that the odd-numbered speed drive gears 38a, 38c, and 38e are smaller in diameter than the even-numbered speed drive gears 38b, 38d, 38f on the whole.

The odd-numbered speed drive gears 38a, 38c, and 38e as above are supported on the first main shaft 31 close to the crankshaft 21. This ensures that the first main shaft 31, and hence the transmission 23, is located as close to the crankshaft 21 as possible and a compactification of the power unit 10 is promised, as compared with the case where the even-numbered speed drive gears 38b, 38d, and 38f are supported on the first main shaft 31.

In the inside of an upper portion of the crankcase 14 (on the upper side of the first main shaft 31 and on the front side of the second main shaft 32), the shift drum 52 in the change mechanism 51 is rotatably borne. Base end portions of the first to fourth shift forks 53a to 53d are engaged respectively with the above-mentioned lead grooves formed in the outer periphery of the shift drum 52.

Each of the shift forks 53a to 53d is widened toward the tip end thereof, and tip end portions of the shift forks 53a to 53d are engaged respectively with the shifters 40a to 40d. The shift forks 53a to 53d and the shifters 40a to 40d are moved in the axial direction according to the pattern of the lead grooves by rotation of the shift drum 52, whereby one of the gear trains is established alternately.

An ECU (not shown) as a controller of the transmission 23 controls operations of the clutches 33 and 34 and the shift drum 52, based on detection information supplied from various sensors, whereby the shift position in the transmission 23 is changed.

Specifically, the transmission 23 is so configured that only one of the clutches 33 and 34 is put into an engaged state and one of the transmission gear trains in conjunction with the engaged clutch is used to perform power transmission. In addition, the next transmission gear train to be established is preliminarily selected from among the transmission gear trains in conjunction with the other of the clutches 33 and 34. Starting from this condition, disengagement of the one clutch and engagement of the other clutch are carried out simultaneously, whereby power transmission is changed over to the power transmission using the preliminarily selected transmission gear train, resulting in an upshift or a downshift of the transmission 23.

In the transmission 23, the clutches 33 and 34 are each kept in a disengaged state when the motorcycle 1 is stopped after the start of the engine. In addition, as a preparation for starting of the motorcycle 1, a change is made from a neutral condition wherein power transmission by any transmission gear train is impossible to a first speed condition wherein the first speed gear (starting gears; first speed gear train 36a) is established. Starting from this condition, an increase in engine rotational speed, for example, causes the first clutch 33 to be brought into an engaged state through partial clutch engagement, whereby the motorcycle 1 is started traveling.

During traveling of the motorcycle 1, the transmission 23 keeps in an engaged state only that one of the clutches which corresponds to the current shift position, and, based on vehicle driving information or the like, preliminarily establishes that one of the transmission gear trains in conjunction with the other clutch in an disengaged state which corresponds to the next shift position.

Specifically, when the current shift position is an odd-numbered gear speed (or an even-numbered gear speed), the next shift position will be an even-numbered gear speed (or an odd-numbered gear speed); therefore, rotational power of the crankshaft 21 is inputted to the first main shaft 31 (or the second main shaft 32) through the first clutch 33 (or the second clutch 34) which is in an engaged state. In this instance, the second clutch 34 (or the first clutch 33) is in a disengaged state, so that rotational power of the crankshaft 21 is not inputted to the second main shaft 32 (or the first main shaft 31).

Thereafter, when it is judged by the ECU that a shift timing has just been reached, the first clutch 33 (or the second clutch 34) being in the engaged state is disengaged, whereas the second clutch 34 (or the first clutch 33) being in the disengaged state is engaged. By only this operation, power transmission is changed over to the power transmission using the preliminarily established transmission gear train corresponding to the next shift position. Consequently, a swift and smooth gear shift without a shift time lag or an interruption of power transmission can be achieved.

Referring to FIGS. 5 and 6, pressing mechanisms 59 of the first and second clutch actuators 57 and 58 operative to individually apply pressures (engaging forces) to the clutches 33 and 34 are provided on a right outside surface of the crankcase 14. Incidentally, while FIG. 6 shows the first clutch actuator 57 corresponding to the first clutch 33, the second clutch actuator 58 corresponding to the second clutch 34 is also configured in the same fashion.

Each of the clutch actuators 57 and 58 includes: the pressing mechanism 59 having the turning shaft 59a disposed to be orthogonal to the main axis C3 and along the vertical direction; an electric motor 61 disposed in parallel to the turning shaft 59a and operative to apply rotational power; and a speed reduction gear mechanism 62 interconnecting the turning shaft 59a and the electric motor 61. Incidentally, in the drawings, reference symbol C8 denotes a turning center axis along the extension direction of the turning shaft 59a, and reference symbol C9 denotes a driving center axis, parallel to the turning center axis C8, of the electric motor 61.

The turning shaft 59a of the pressing mechanism 59 is rotatably supported inside a hollow cylindrical mechanism containing part 14d formed as one body with the clutch cover 14b. The turning shaft 59a includes an eccentric shaft 59b provided at a part intersecting the main axis C3, and an eccentric roller 59c coaxially supported on the eccentric shaft 59b. The eccentric roller 59c abuts at its outer peripheral surface on a right end surface of the pressure cap 44c of the first clutch 33. When the eccentric shaft 59b and the eccentric roller 59c are displaced to the right side, the clutch plate group 41 is not clamped under pressure, so that a clutch disengagement state results. When the eccentric shaft 59b and the eccentric roller 59c are displaced to the left side, the clutch plate group 41 is clamped under pressure, resulting in a clutch engagement state.

The electric motor 61 has a drive shaft 61b, a tip portion of which projects downward from a motor body 61a. The tip portion of the drive shaft 61b forms a pinion gear 61c. The pinion gear 61c is located at substantially the same height as a driven gear 59d coaxially attached to an upper end portion of the turning shaft 59a.

The speed reduction gear mechanism 62 interconnecting the pinion gear 61c and the driven gear 59d has a structure in which three reduction gear shafts 62a to 62c each integrally formed with large and small spur gears are rotatably supported inside a casing 62d. The speed reduction gear mechanism 62 and the electric motor 61 are provided so as to protrude to the upper side of the crankcase 14 on the rear side of the cylinder 15. Incidentally, in the drawings, reference symbol 63 denotes a turning sensor (clutch engagement/disengagement sensor) disposed coaxially on the upper side of the turning shaft 59a, and reference symbol CL denotes a left-right-directional center line of the power unit 10 and the motorcycle 1.

As above-described, the motorcycle 1 according to the present invention has a power unit 10 including: the crankshaft 21; the first and second main shafts 31 and 32 disposed in this order from the crankshaft 21 side; the single counter shaft 35 engaged with both the main shafts 31 and 32; the crankcase 14 on which the crankshaft 21, the main shafts 31 and 32 and the counter shaft 35 are rotatably borne in parallel to one another; the first and second clutches 33 and 34 disposed respectively at end portions of the main shafts 31 and 32 and individually permitting/interrupting transmission of rotational power from the crankshaft 21 to the main shafts 31 and 32; and the gear trains 36a, 36c, 36e, 37b, 37d, and 37f for a plurality of gear speeds which are provided between the main shafts 31 and 32 and the counter shaft 35 and are selectively established, with a shift position being changed by changing over the engaged/disengaged states of the clutches 33 and 34.

The motorcycle further has the swing arm 9 supporting the drive wheel (rear wheel 11), and the pivot shaft 27 which is parallel to the shafts 31, 32, and 35 and by which the swing arm 9 is supported to be swingable upward and downward. The axis center (first main axis C3) of the first main shaft 31 is disposed rearwardly of the axis center (crank axis C2) of the crankshaft 21 and forwardly of the axis center (counter axis C5) of the counter shaft 35, and the axis center (second main axis C4) of the second main shaft 32 is disposed rearwardly of the axis center (counter axis C5) of the counter shaft 35 and forwardly of the axis center (pivot axis C7) of the pivot shaft 27.

According to this configuration, in the power unit 10 having the pair of main shafts 31 and 32 and the pair of clutches 33 and 34, the height size of the crankcase 14 can be made small by arranging the main shafts 31 and 32 and the clutches 33 and 34 on the front and rear sides. Consequently, it is easy to secure a layout space for an intake system and the like on the upper side of the crankcase 14, and it is possible to suppress the amount of downward projection of the crankcase 14.

Besides, the axis center (first main axis C3) of the first main shaft 31 may be disposed below the axis centers (crank axis C2, pivot axis C7) of the crankshaft 21 and the pivot shaft 27, and the axis center (second main axis C4) of the second main shaft 32 may be disposed above the axis centers (crank axis C2, pivot axis C7) of the crankshaft 21 and the pivot shaft 27. This configuration ensures that the main shafts 31 and 32 and the clutches 33 and 34 can be distributed (i.e., arranged) on the upper and lower sides between the crankshaft 21 and the pivot shaft 27. Accordingly, the distance from the crankshaft 21 to the pivot shaft 27 can be shortened, and the periphery of the power unit 10 can be formed to be compact in the back-and-forth direction.

In addition, in the motorcycle 1, the axis center (counter axis C5) of the counter shaft 35 may be disposed above the axis center (pivot axis C7) of the pivot shaft 27. This configuration ensures that even in taking out power from the counter shaft 35 to the outside of the unit, the output part and the pivot shaft 27 can be easily disposed close to each other, and the amount of swinging of the swing arm 9 can be easily secured.

As above-described, the vehicle power unit 10 according to the present invention includes: the crankshaft 21; the first and second main shafts 31 and 32 disposed in this order from the crankshaft 21 side; the single counter shaft 35 engaged with both the main shafts 31 and 32; the crankcase 14 on which the crankshaft 21, the main shafts 31 and 32 and the counter shaft 35 are rotatably borne in parallel to one another; the first and second clutches 33 and 34 disposed respectively at end portions of the main shafts 31 and 32 and individually permitting/interrupting transmission of rotational power from the crankshaft 21 to the main shafts 31 and 32; and the gear trains 36a, 36c, 36e, 37b, 37d, and 37f for a plurality of gear speeds which are provided between the main shafts 31 and 32 and the counter shaft 35 and are selectively established, with a shift position being changed by changing over the engaged/disengaged states of the clutches 33 and 34.

Odd-numbered speed drive gears 38a, 38c, and 38e of the gear trains 36a, 36c, 36e, 37b, 37d, and 37f are disposed on the first main shaft 31, and even-numbered speed drive gears 38b, 38d, and 38f of the gear trains 36a, 36c, 36e, 37b, 37d, and 37f are disposed on the second main shaft 32.

According to this configuration, the odd-numbered drive gears 38a, 38c, and 38e smaller than the even-numbered drive gears 38b, 38d, and 38f in diameter on the whole are disposed on the first main shaft 31 near the crankshaft 21. This makes it possible to easily suppress interference, particularly between the crank web 21b of the crankshaft 21 and the drive gears on the first main shaft 31. Consequently, it is possible to shorten the distance between the axis of the crankshaft 21 and the first main shaft 31 and thereby to reduce the size of the unit as a whole.

In addition, the power unit 10 may have a configuration wherein rotational power of the crankshaft 21 is inputted to the first main shaft 31 and the first clutch 33 through the primary gears (the primary drive gear 22, and the large-diameter power transmission gear 45 of the first clutch 33), and is further inputted from the primary gears to the second main shaft 32 and the second clutch 34 through the small-diameter power transmission gear 46 of the first clutch 33, the idle gear 47 and the small-diameter power transmission gear 46 of the second clutch 34, and the idle gear 47 is supported on the counter shaft 35 located between the main shafts 31 and 32. This ensures that rotational power of the crankshaft 21 can be efficiently transmitted to the second main shaft 32, which is located farther from the crankshaft 21 than the first main shaft 31, through the idle gear 47 supported on the counter shaft 35 located between the main shafts 31 and 32.

Incidentally, the present invention is not to be restricted to the above-described embodiment. For example, the engine of the power unit includes not only the air-cooled single-cylinder engine but also other various types of reciprocating engines such as water-cooled engines, parallel or V-type or other multi-cylinder engines, longitudinal engines in which a crankshaft is set along the back-and-forth direction of the vehicle, etc.

In addition, the saddle type vehicle generally includes those vehicles in which the driver is seated astride a vehicle body; thus, it includes not only two-wheeled vehicles (inclusive of scooter type vehicles) but also three-wheeled vehicles (inclusive of two-front-wheel one-rear-wheel vehicles as well as one-front-wheel two-rear-wheel vehicles) and four-wheeled vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle type vehicle comprising a power unit, the saddle type vehicle comprising:
   a crankshaft;
   first and second main shafts disposed in this order from said crankshaft side;
   a single counter shaft engaged with both said main shafts;
   a crankcase on which said crankshaft, said main shafts and said counter shaft are rotatably borne in parallel to one another;
first and second clutches disposed respectively at end portions of said main shafts and individually permitting/interrupting transmission of rotational power from said crankshaft to said main shafts;
   gear trains for a plurality of gear speeds which are provided on said main shafts and said counter shaft and are selectively established by rotation of a shift drum parallel to said shafts, with a shift position being changed by changing over engaged/disengaged states of said clutches, and with power being transmitted from an end portion of said counter shaft that protrudes from said crankcase to a drive wheel, and
   a swing arm supporting said drive wheel on a rear portion thereof, and a pivot shaft which is disposed rearwardly of said crankcase in parallel to said shafts and by which said swing arm is supported at a front portion thereof so as to be swingable upward and downward,
   wherein an axis center of said first main shaft is disposed rearwardly of an axis center of said crankshaft and forwardly of an axis center of said counter shaft, and an axis center of said second main shaft is disposed rearwardly of said axis center of said counter shaft and forwardly of an axis center of said pivot shaft.

2. The saddle type vehicle according to claim 1, wherein said axis center of said first main shaft is disposed below said axis centers of said crankshaft and said pivot shaft, and said axis center of said second main shaft is disposed above said axis centers of said crankshaft and said pivot shaft.

3. The saddle type vehicle according to claim 1, wherein said axis center of said counter shaft is disposed above said axis center of said pivot shaft.

4. The saddle type vehicle according to claim 1, wherein said shafts are so disposed that a shaft disposed on a more rearward side is located at a higher position.

5. The saddle type vehicle according to claim 1, wherein at least a part of a rear portion of said crankcase in which said second clutch is contained is disposed above said pivot shaft.

6. The saddle type vehicle according to claim 1, wherein at least a part of said second clutch is disposed above said pivot shaft.

7. The saddle type vehicle according claim 1, wherein at least a part of the outside diameter of said second clutch is disposed forwardly of said axis center of said counter shaft.

8. The saddle type vehicle according to claim 1, wherein one of said axis centers of said main shafts is disposed above a line interconnecting said axis center of said crankshaft and said axis center of said pivot shaft, while the other is disposed below said line; and
   said clutches are so disposed that at least certain parts of them overlap each other in an upper-lower relation.

9. The saddle type vehicle according to claim 1, wherein said shift drum is disposed above said first clutch and forwardly of said second clutch.

10. The saddle type vehicle according to claim 1, wherein the first main shaft is disposed nearer to the crankshaft than the counter shaft, and
    odd-numbered speed drive gears in the gear trains are disposed on the first main shaft, and
    even-numbered speed drive gears in the gear trains are disposed on the second main shaft.

11. The saddle type vehicle according to claim 10, wherein rotational power of the crankshaft is inputted to the first main shaft through primary gears and inputted from the primary gears to the second main shaft through an idle gear.

12. The saddle type vehicle according to claim 11, wherein the idle gear is supported on the counter shaft located between the main shafts.

13. The saddle type vehicle according to claim 1, further comprising:
    a generator supported on one end of the crankshaft; and
    a generator room which is provided in the crankcase and in which the generator is contained,
        wherein a first speed gear which is the smallest in diameter of the odd-numbered speed drive gears and the generator room overlap each other as viewed along the axial direction of the crankshaft.

14. The saddle type vehicle according to claim 10, wherein a fifth speed gear which is the largest in diameter of the odd-numbered speed drive gears and a crank bearing overlap each other as viewed along the axial direction of the crankshaft.

15. The saddle type vehicle according to claim 10, wherein a crank web of the crankshaft is provided with a cutout for avoiding at least one of the odd-numbered speed drive gears.

16. A saddle type vehicle comprising a power unit, the saddle type vehicle comprising:
    a crankshaft;
    first and second main shafts disposed in this order from said crankshaft side;
    a single counter shaft engaged with both said main shafts;
    a crankcase on which said crankshaft, said main shafts and said counter shaft are rotatably borne in parallel to one another;
    first and second clutches disposed respectively at end portions of said main shafts and individually permitting/interrupting transmission of rotational power from said crankshaft to said main shafts;
    gear trains for a plurality of gear speeds which are provided on said main shafts and said counter shaft and are selectively established by rotation of a shift drum parallel to said shafts, with a shift position being changed by changing over engaged/disengaged states of said clutches, and with power being transmitted from an end portion of said counter shaft that protrudes from said crankcase to a drive wheel, and
    a swing arm supporting said drive wheel on a rear portion thereof, and a pivot shaft which is disposed rearwardly of said crankcase in parallel to said shafts and by which said swing arm is supported at a front portion thereof so as to be swingable upward and downward, wherein an axis center of said first main shaft is disposed rearwardly of an axis center of said crankshaft and forwardly of an axis center of said counter shaft, and an axis center of said second main shaft is disposed rearwardly of said axis center of said counter shaft and forwardly of an axis center of said pivot shaft, wherein rotational power of the crankshaft is inputted to the first main shaft through primary gears and inputted from the primary gears to the second main shaft through an idle gear.

17. The saddle type vehicle according to claim 16, wherein said axis center of said first main shaft is disposed below said axis centers of said crankshaft and said pivot shaft, and said axis center of said second main shaft is disposed above said axis centers of said crankshaft and said pivot shaft.

18. The saddle type vehicle according to claim 16, wherein said axis center of said counter shaft is disposed above said axis center of said pivot shaft.

19. The saddle type vehicle according to claim 16, wherein said shafts are so disposed that a shaft disposed on a more rearward side is located at a higher position.

20. The saddle type vehicle according to claim 16, wherein at least a part of a rear portion of said crankcase in which said second clutch is contained is disposed above said pivot shaft.

* * * * *